US006954141B2

(12) United States Patent
Sekizawa et al.

(10) Patent No.: US 6,954,141 B2
(45) Date of Patent: Oct. 11, 2005

(54) APPARATUS AND METHOD FOR TIRE MONITORING SYSTEM

(75) Inventors: Takatoshi Sekizawa, Kariya (JP); Hiromasa Hayashi, Obu (JP); Akihiro Taguchi, Obu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/038,124

(22) Filed: Jan. 21, 2005

(65) Prior Publication Data
US 2005/0162264 A1 Jul. 28, 2005

(30) Foreign Application Priority Data
Jan. 22, 2004 (JP) .............................. 2004-014365

(51) Int. Cl.$^7$ ............................................ B60C 23/00
(52) U.S. Cl. ..................... 340/447; 340/442; 340/446; 73/146
(58) Field of Search ................................ 340/442–448; 73/146, 146.2–146.5, 146.8; 701/1

(56) References Cited

U.S. PATENT DOCUMENTS

| | | | |
|---|---|---|---|
| 6,018,993 A * | 2/2000 | Normann et al. .......... 73/146.5 |
| 6,604,415 B2 | 8/2003 | Imao et al. ................. 73/146.5 |
| 2003/0179082 A1 | 9/2003 | Ide ........................... 340/425.5 |
| 2004/0257213 A1 * | 12/2004 | Tsujita ........................ 340/445 |

FOREIGN PATENT DOCUMENTS

JP    A-2003-118333    4/2004

\* cited by examiner

*Primary Examiner*—Phung T. Nguyen
(74) *Attorney, Agent, or Firm*—Posz Law Group, PLC

(57) ABSTRACT

A tire monitoring apparatus for a vehicle has plural transmitters arranged in plural tires for detecting air pressure of the corresponding tire and transmitting information including a detecting result by a radio wave, plural receivers for receiving the information transmitted from the respective transmitters, and signal receiving sensitivity changing means for changing signal receiving sensitivities. In the apparatus, each of the receivers is arranged in such a manner that a distance between one receiver and its corresponding transmitter is made shorter than the other distances between the one receiver and the other transmitters. A control means controls the signal receiving sensitivity changing means such that each of the receivers receives only the information included in the radio wave, which has a largest signal receiving level among the radio waves transmitted from the plural transmitters.

8 Claims, 4 Drawing Sheets

FIG. 6

| TRANSMITTERS | SIGNAL RECEIVING LEVELS | SIGNAL RECEIVING SENSITIVITY | RADIO WAVE ACCEPTED (OR NOT ACCEPTED) |
|---|---|---|---|
| FL | 60dB | | ○ |
| FR | 40dB | 50dB | × |
| RL | 30dB | | × |
| RR | 20dB | | × |

FIG. 7

| SIGNAL RECEIVING SENSITIVITY | TRANSMITTERS | FL | FR | RL | RR |
|---|---|---|---|---|---|
| 10 | RADIO WAVE ACCEPTED (OR NOT ACCEPTED) | ○ | ○ | ○ | ○ |
| ↓ | SIGNAL RECEIVING SENSITIVITY IS MADE WORSE | | | | |
| 25 | RADIO WAVE ACCEPTED (OR NOT ACCEPTED) | ○ | ○ | ○ | × |
| ↓ | . . . . . . . . . . . | | | | |
| | SIGNAL RECEIVING SENSITIVITY IS FURTHER MADE WORSE, UNTIL THE NUMBER OF IDS ACCEPTED BECOMES ONE | | | | |
| 50 | RADIO WAVE ACCEPTED (OR NOT ACCEPTED) | ○ | × | × | × |
| | THE CONTROL ECU DETERMINES THAT THE RECEIVED ID IS FROM FL WHEEL | | | | |

APPARATUS AND METHOD FOR TIRE MONITORING SYSTEM

CROSS REFERENCE TO RELATED APPLICATION

This application is based on Japanese Patent Application No. 2004-14365 filed on Jan. 22, 2004, the disclosure of which is incorporated herein by reference.

FIELD OF THE INVENTION

The present invention relates to a tire monitoring apparatus and a tire monitoring method for monitoring a vehicle condition.

BACKGROUND OF THE INVENTION

A tire monitoring apparatus is known in the art, in which an air pressure of each tire is transmitted by a radio wave from an air pressure sensor and a transmitter arranged in the wheel of each tire, the radio wave is received by a receiving antenna arranged within each wheel house, and the information containing the air pressure is notified to a driver by a meter within a vehicle room.

For example, as disclosed in Japanese Patent Publication No. 2002-257661, a tire monitoring apparatus has plural transmitters arranged in each tire and plural receiving antennas arranged in a vehicle body, so as to respectively correspond to the transmitters. The apparatus further has plural level changing means for the respective receiving antennas to reduce the level of a voltage signal induced by the receiving antenna, a coupling means for forming one synthesizing voltage signal by synthesizing voltage signals received from these level changing means, and a control means for controlling the operation of the level changing means.

In the above tire monitoring apparatus, the control means automatically discriminates, from which transmitter the receiving antenna has received the information contained in the received radio wave, based on an assumption that the radio wave from the transmitter is mainly received by the corresponding receiver.

The discrimination in the above apparatus is performed in the following manner.

When one of the transmitters transmits the radio wave, this radio wave is received by each of the plural receiving antennas. And each receiving antenna induces a voltage signal according to electric field intensity of the received radio wave. The respective voltage signals outputted from each receiving antenna are made to one synthesizing voltage signal by the coupling means through the level changing means for the respective receiving antennas.

At this time, the plural receiving antennas are located at different positions from each other with respect to the transmitter transmitting the radio wave. Therefore, the magnitudes of the voltages induced by the respective receiving antennas are different from each other. The voltage induced by the receiving antenna nearest to the transmitter transmitting the radio wave is largest.

In the above tire monitoring apparatus, when one of the transmitters transmits the radio wave and the synthesizing voltage signal is produced, one of the level changing means is operated to perform a level reducing operation, so that the synthesizing voltage signal is reduced by a voltage signal of such level changing means. A reduced amount of the synthesizing voltage signal is memorized in the control means.

The above operation of the level changing means is respectively performed in a sequential order for the four receiving antennas with a certain time intervals, and the respective reduced amounts are compared to determine which voltage signal of the receiving antennas has the largest reduced amount and thereby to determine which transmitter has transmitted the radio wave.

Thus, the control means can automatically determine from which transmitter provided in the tire the receiving antenna has received the information contained in the radio wave.

In the above tire monitoring apparatus, when one of the transmitters transmits the radio wave, one synthesizing voltage signal is formed by synthesizing the voltage signals received from the level changing means by the coupling means. And the control means determines from which transmitter provided in the tire the receiving antenna has received the information contained in the radio wave, by a degree of reducing the level of the synthesizing voltage signal.

As a result, the respective transmitters are recognized only one by one, and thereby it takes time until all the transmitters are recognized. Furthermore, since the coupling means is necessary, the number of constructional elements of the tire monitoring apparatus is large and the coupling means is a factor of an increase of manufacture cost of this apparatus.

SUMMARY OF THE INVENTION

The present invention is made in view of the above problems, and it is an object of the present invention to provide a tire monitoring apparatus and a tire monitoring method, which can shorten time necessary for recognizing all the transmitters arranged in the tires and simplify the structure of the apparatus in comparison with the conventional apparatus.

According to a feature of the present invention, a tire monitoring apparatus comprises; plural transmitting means respectively arranged in plural tires, each having a detecting means for detecting air pressure of the corresponding tire, and transmitting information including a detecting result by a radio wave; plural receiving means arranged in the vehicle, corresponding to the respective transmitting means and receiving the information transmitted from the respective transmitting means; signal receiving sensitivity changing means respectively provided in the receiving means and for changing signal receiving sensitivities thereof; and a control means for receiving the information from the receiving means and performing a control operation so as to display the detecting result included in the information at a display means.

In the tire monitoring apparatus, each of the receiving means is arranged in such a manner that a distance between one receiving means and its corresponding transmitting means is made shorter than the other distances between the one receiving means and the other transmitting means, each of the receiving means is connected to the control means, so that each of the receiving means independently transmits the information to the control means when it receives the information contained in the radio wave, and the control means controls the signal receiving sensitivity changing means such that each of the receiving means receives only the information included in the radio wave, which has a largest signal receiving level among the radio waves transmitted from the plural transmitting means.

According to the above feature of the present invention, since the information is separately inputted to the control means from the respective receiving means, the signal receiving sensitivity can be simultaneously changed by the control means for all of the receiving means, so that the control means determines which of the transmitting means has transmitted the information.

As a result, the time taken until the recognition of all of the transmitting means can be shortened and the structure of the apparatus can be simplified in comparison with the conventional apparatus.

According to another feature of the present invention, the control means controls the signal receiving sensitivity changing means to make worse the signal receiving sensitivity, after the information transmitted from more than one transmitting means is received by the receiving means, or after the information transmitted from all of the transmitting means is received by each of the receiving means.

As a result, an erroneous recognition, which could be caused in the case that the receiving means would not receive the radio wave from the corresponding transmitting means, is prevented.

According to a further feature of the present invention, an ID for discriminating the respective transmitting means is included in the respective information contained in the radio wave and the respective IDs for the transmitting means are registered in the control means in advance, and the control means controls the signal receiving sensitivity changing means to make worse the signal receiving sensitivity so that only one ID is inputted from the respective receiving means to the control means, after each of the receiving means has received the plural information of the IDs which are the same to those registered in advance in the control means.

According to a still further feature of the present invention, each of the receiving means comprises; a receiving antenna for receiving the radio wave transmitted from the transmitting means; and a converter for converting an analog signal outputted from the receiving antenna into a digital signal in accordance with the received radio wave, wherein the signal receiving sensitivity changing means is a variable resistor connected between the receiving antenna and the converter.

BRIEF DESCRIPTION OF THE DRAWINGS

The above and other objects, features and advantages of the present invention will become more apparent from the following detailed description made with reference to the accompanying drawings. In the drawings:

FIG. 6 is a table showing one example of the receiving level of a radio wave at the FL receiver 21 transmitted from each of the transmitters 11 to 14, and acceptance or non-acceptance of the signal; and FIG. 7 is a table showing the concept of the automatic recognition processing of each of the transmitters 11 to 14 executed by the control ECU 30.

DETAILED DESCRIPTION OF THE PREFERRED EMBODIMENTS

First Embodiment

The present invention will be explained below with reference to the embodiments.

Figure 1:
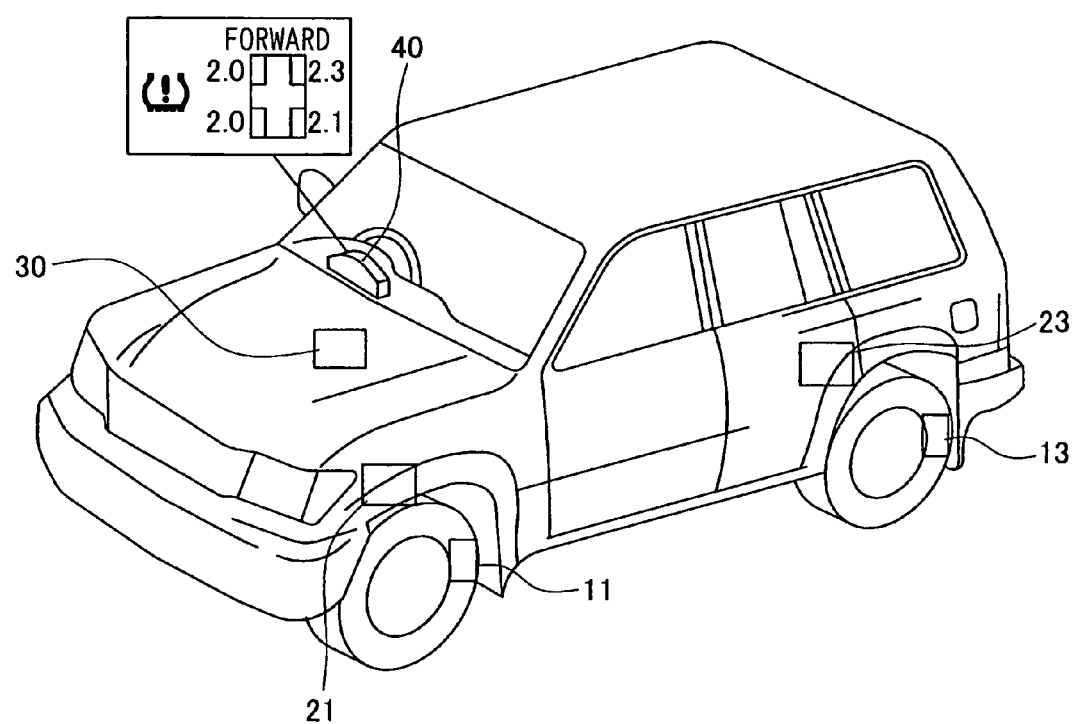
FIG. 1 is a view showing a tire monitoring apparatus, mounted in a vehicle, according to an embodiment of the present invention.
Figure 2:
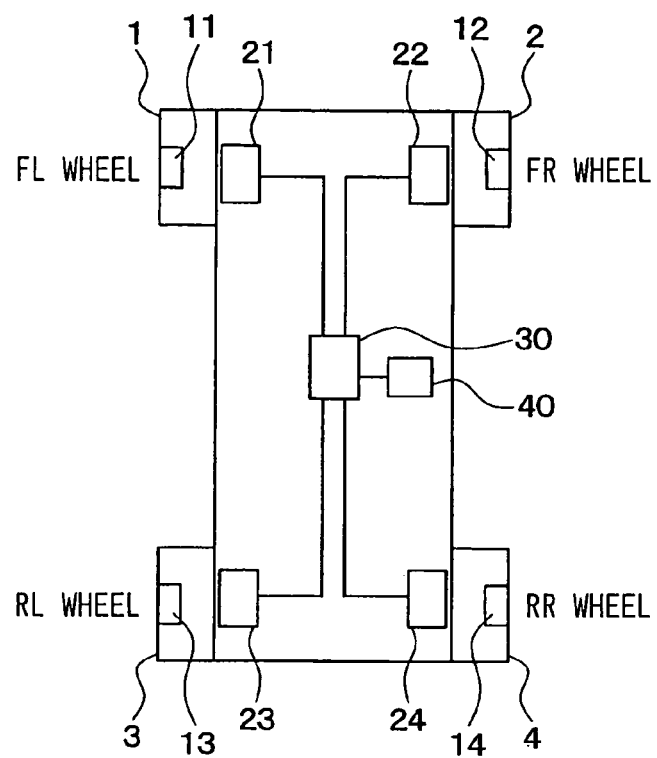
FIG. 2 is a schematic view showing the tire monitoring apparatus according to the embodiment of the present invention.

FIGS. 1 and 2 show a schematic construction of a tire monitoring apparatus according to a first embodiment of the present invention. As shown in FIGS. 1 and 2, the tire monitoring apparatus of this embodiment comprises multiple transmitters 11 to 14, each having a sensor section and a transmitting section, multiple receivers 21 to 24, a control ECU 30, and a meter 40. In FIG. 1, the transmitters 12, 14 and the receivers 22, 24 located on the right-hand side of a vehicle are omitted. With respect to the corresponding relation of this embodiment and the invention, the sensor section of each transmitter 11 to 14 corresponds to a detecting means, and the transmitting section of each transmitter 11 to 14 corresponds to a signal transmitting means. Further, each of the receivers 21 to 24 corresponds to a signal receiving means, and the control ECU 30 corresponds to a control means, and the meter 40 corresponds to a display means.

As shown in FIG. 2, the transmitters 11 to 14 are respectively attached to the tires 1 to 4 of four wheels. The transmitters respectively attached to the tire 1 of the left-hand side of a front wheel, the tire 2 of the right-hand side of the front wheel, the tire 3 of the left-hand side of a rear wheel, and the tire 4 of the right-hand side of the rear wheel, are sequentially an FL transmitter 11, an FR transmitter 12, an RL transmitter 13 and an RR transmitter 14. In this embodiment, the left-hand and right-hand sides of the front wheel as well as the left-hand and right-hand sides of the rear wheel are respectively designated as FL, FR, RL and RR.

Each of the transmitters 11 to 14 is a generally known transmitter. For example, each of the transmitters 11 to 14 is of an integral type with an air valve of a disk wheel. The sensor section of the transmitters 11 to 14 measures a tire state, such as air pressure and temperature of the tire. On the other hand, the transmitting section of the transmitters 11 to 14 transmits a measuring value measured by the corresponding sensor section within the same transmitter and the ID of each transmitter to each of the corresponding receivers 21 to 24 by a radio wave. In this case, the ID is an identification signal for discriminating each of the transmitters 11 to 14. The measuring value and the ID correspond to information transmitted by the signal transmitting means in the invention.

Each of the transmitters 11 to 14 has a battery in its interior, and transmits the radio wave with this battery as a power source. This radio wave is transmitted every each of the transmitters 11 to 14 at a transmitting time interval set in advance. The timing of the radio wave transmission executed by each of the transmitters 11 to 14 may be set to the same timing between the respective transmitters 11 to 14 and may be also set to be different between the respective transmitters 11 to 14.

As shown in FIG. 1 or 2, the receivers 21 to 24 are respectively attached into each wheel house. As shown in FIG. 2, the receivers attached into the wheel houses of the left-hand and right-hand sides of the front wheel as well as the left-hand and right-hand sides of the rear wheel are respectively designated as an FL receiver 21, an FR receiver 22, an RL receiver 23 and an RR receiver 24.

The respective receivers 21 to 24 are arranged correspondingly to the respective transmitters 11 to 14. Namely, the FL receiver 21, the FR receiver 22, the RL receiver 23 and the RR receiver 24 are respectively arranged correspondingly to the FL transmitter 11, the FR transmitter 12, the RL transmitter 13 and the RR transmitter 14.

Figure 3:
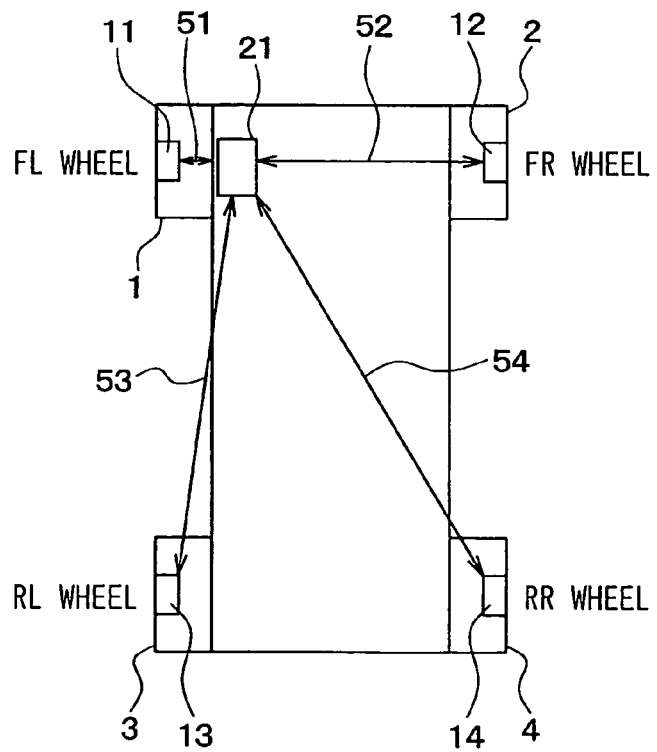
FIG. 3 is a schematic view for comparing distances between an FL receiver 21 and respective transmitters 11 to 14 in the embodiment of the present invention shown in FIGS. 1 and 2.

Since the respective receivers 21 to 24 are arranged as mentioned above, a distance between the receivers and the transmitters in each pair is shorter than the other distances between the receivers and the transmitters which are not constituting the pair. For example, as shown in FIG. 3, the distances 51, 52, 53, 54 between the receiver 21 and the transmitters 11 to 14, are increased in an order of the distance 51 to the distance 54.

Each of the receivers 21 to 24 is directly connected to the control ECU 30 by a signal line. When the receivers 21 to 24 receive the radio wave transmitted from the transmitters 11 to 14, the receivers 21 to 24 separately transmits a voltage signal according to the received radio wave to the control ECU 30.

Figure 4:
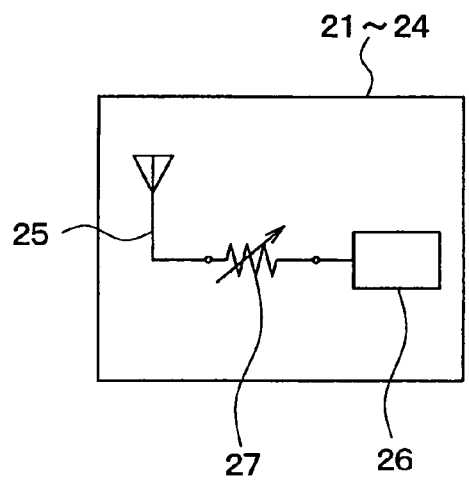
FIG. 4 is a schematic view showing a structure of receivers 21 to 24 in FIGS. 1 and 2.

The constructions of the receivers 21 to 24 are shown in FIG. 4. As shown in FIG. 4, each of the receivers 21 to 24 has a receiving antenna 25, an AD converter 26 and a variable resistor 27. The receiving antenna 25 and the AD converter 26 are connected to each other by a signal line through the variable resistor 27. The transmission of a signal from the receivers 21 to 24 to the control ECU 30 is not limited to such a wired type, but can be also set to a wireless type.

The receiving antenna 25 receives the radio wave transmitted from each of the transmitters 11 to 14, and outputs the voltage signal according to the intensity of this radio wave to the AD converter 26. The AD converter 26 converts the voltage signal inputted from the receiving antenna 25 from an analog signal to a digital signal. This AD converter 26 corresponds to the converter of the invention. If the voltage signal inputted from the receiving antenna 25 has a predetermined level or more, the AD converter 26 converts the voltage signal. However, when the inputted voltage signal is lower than the predetermined level, the AD converter 26 does not convert this voltage signal. The converted digital signal is outputted from the AD converter 26 to the control ECU 30.

The variable resistor 27 can change the resistance value. This variable resistor 27 corresponds to a signal receiving sensitivity changing means of the invention. The variable resistor 27 is connected to the control ECU 30 by a signal line although this connection is not shown in the drawings. The magnitude of the resistance value is controlled by an operation instruction signal from the control ECU 30. The level of the voltage signal outputted from the receiving antenna 25 is changed by this variable resistor 27. Namely, the signal receiving sensitivities of the receivers 21 to 24 are changed by the variable resistor 27.

The control ECU 30 has a general construction. For example, the control ECU 30 has a microcomputer, a memory such as a ROM and a RAM. For example, electricity is supplied to the control ECU 30 by a battery, and the electricity is supplied from the control ECU 30 to each of the receivers 21 to 24. The ID of each of the transmitters 11 to 14, etc. are stored in the memory.

As explained later, the control ECU 30 controls the operation of the variable resistor 27 such that only a signal according to the radio wave transmitted from each of the transmitters 11 to 14 corresponding to the respective receivers 21 to 24 is converted by the AD converter 26 in each of the receivers 21 to 24.

Further, when each of the receivers 21 to 24 receives the radio wave transmitted from the respective transmitters 11 to 14, a signal according to the received radio wave is separately inputted from the receivers 21 to 24 to the control ECU 30. This inputted signal has the contents of the ID of each of the transmitters 11 to 14 and measuring results.

The control ECU 30 discriminates whether the signal inputted from each of the receivers 21 to 24 is a signal transmitted from one of the transmitters 11 to 14 of its own vehicle by the ID included in this inputted signal. When the control ECU 30 recognizes that this inputted signal is a signal transmitted from one of the transmitters 11 to 14 of its own vehicle, the control ECU 30 outputs an operation instruction signal to the meter 40 so as to display the measuring result of each of the transmitters 11 to 14 included in the signal inputted from each of the receivers 21 to 24.

The meter 40 has a general construction, and is arranged in an instrument panel of the vehicle. The meter 40 has a display means such as a warning lamp of tire air pressure, a display segment for digitally displaying the tire air pressure, etc.

An operation of the tire monitoring apparatus constructed as mentioned above will be explained. In the following description, a case for automatically recognizing the FL transmitter 11 by the control ECU 30 will be explained as an example. A process for automatically recognizing the other transmitters 12, 13 and 14 is performed in the same manner to the FL transmitter 11.

Figure 5:
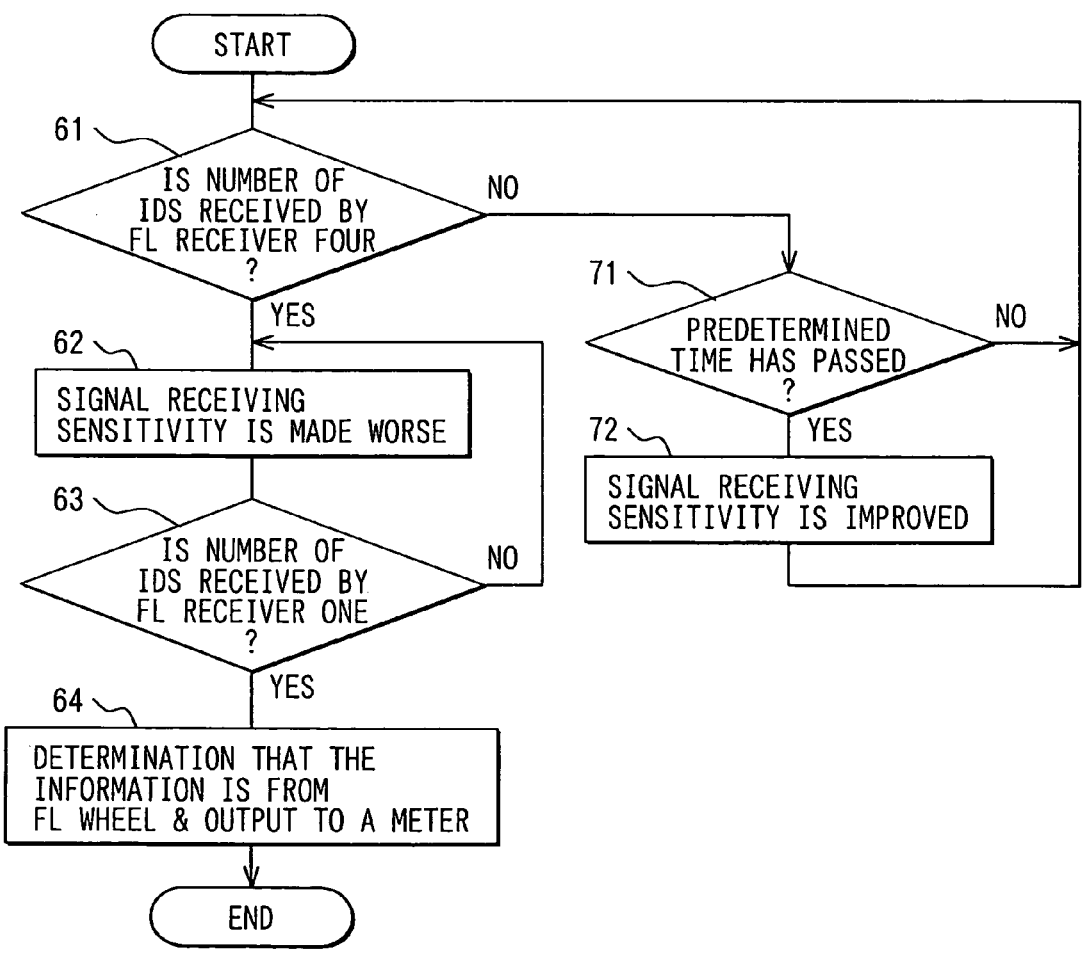
FIG. 5 is a flow chart of automatic recognition processing of each of the transmitters 11 to 14 executed by a control ECU 30 in FIGS. 1 and 2.

FIG. 5 shows a flow chart of the automatic recognition processing of the FL transmitter 11 executed by the control ECU 30. Each step shown in the flow chart of FIG. 5 is executed when an ignition switch is turned on. Each step is basically repeatedly executed until the ignition switch is turned off.

Each of the transmitters 11 to 14 transmits the measuring result such as the air pressure within the tire by the radio wave together with the ID of the corresponding transmitters 11 to 14. The radio wave transmitted from the transmitters 11 to 14 is set to reach each of the receivers 21 to 24.

In this embodiment, at the initial stage from the start of the automatic recognition processing to a step 61, the FL receiver 21 sets the signal receiving sensitivity of the FL receiver 21 to a preferable state, i.e., highly sets this signal receiving sensitivity so as to receive all these radio waves and output signals according to these radio waves to the control ECU 30.

Accordingly, at the initial stage of the automatic recognition processing, signals having the contents of the measuring results and the IDs transmitted from all the transmitters 11 to 14 are basically inputted from the FL receiver 21 to the control ECU 30. Since information for discriminating each of the receivers 21 to 24 is included in the signal transmitted from each of the receivers 21 to 24, the control ECU 30 can recognize from which receiver the signal is received.

Therefore, in the step 61, it is determined whether the number of IDs received by the FL receiver 21 is four or not. In this embodiment, the reception of the ID by the FL receiver 21 means the following contents. Namely, the receiving antenna 25 receives the radio wave transmitted from the FL transmitter 11, and the receiving antenna 25 outputs the voltage signal according to this radio wave to the AD converter 26. The AD converter 26 then converts the voltage signal inputted from the receiving antenna 25 from an analog signal to a digital signal, and outputs this voltage signal to the control ECU 30. Accordingly, in other words, it is determined in the step 61 whether the number of IDs inputted from the FL receiver 21 to the control ECU 30 is four or not.

At this time, it is also determined whether these four IDs conform to IDs registered in advance or not. Namely, in this step 61, it is determined whether the FL receiver 21 receives the IDs from all the transmitters 11 to 14 of its own vehicle or not. These determination is made to always confirm that the FL receiver 21 receives the measuring result transmitted from the FL transmitter 11 by recognizing the IDs transmitted from all the transmitters 11 to 14 of its own vehicle.

Accordingly, in the step 61, the ID transmitted from each of the transmitters 11 to 14 and inputted to the control ECU 30 is collated with the ID registered to a memory in advance. If these IDs conform to each other, the ID determined as OK in the collation is stored to the memory. The control ECU 30 determines whether the four IDs determined as OK in this collation is stored to the memory or not.

This step 61 is executed after a predetermined time has passed from the start of the automatic recognition processing, wherein the predetermined time corresponds to, for example, about ten times of a transmitting interval for transmitting the radio waves from the respective transmitters 11 to 14 to the receivers 21 to 24. The step 61 can be alternatively executed by several times during such predetermined time.

The predetermined time, which corresponds to about ten times of the transmitting interval, would be ten minutes, if the transmitting interval of each of the transmitters 11 to 14 is e.g., one minute. This predetermined time is set, so that the step 61 can be surely executed after the four IDs are reliably inputted from the FL receiver 21 to the control ECU 30. The length of the predetermined time can be, therefore, set to another length, if the length of the other predetermined time has such a time length, in which the radio waves from all the transmitters 11 to 14 are received by the FL receiver 21 and the four IDs are inputted to the control ECU 30.

A process goes to a step 62 when it is determined that the number of IDs inputted from the FL receiver 21 to the control ECU 30 is four.

On the other hand, when it is determined in the step 61 that the number of IDs inputted from the FL receiver 21 is not four, the step 61 is repeated until it is determined that the number of IDs is four.

In this case, it can be considered that the signal receiving sensitivity of the FL receiver 21 was bad and thereby it was determined that inputted number of IDs were not four. Therefore, the signal receiving sensitivity of the FL receiver 21 is further set to a preferable state until the control ECU 30 can determine that the number of IDs inputted from the FL receiver 21 become four. In this case, the step 61 is repeated after the signal receiving sensitivity of the FL receiver 21 is set to the preferable state, and after the above explained predetermined time has passed.

Namely, when it is determined in the step 61 that the number of IDs inputted from the FL receiver 21 is not four, the process goes to a step 71. In the step 71, it is determined whether a predetermined time has passed from the start or not. As mentioned above, this predetermined time is e.g., the time corresponding to about ten times of the transmitting interval for the transmitters 11 to 14.

When it is determined in the step 71 that the predetermined time has passed, the process goes to a step 72. In the step 72, the signal receiving sensitivity of the FL receiver 21 is changed to a preferable state by the variable resistor 27.

Thereafter, the process goes back to the step 61. The process for the steps 71 and 72 are repeated until the control ECU 30 can determine that the number of IDs inputted from the FL receiver 21 become four.

In the step 62, the signal receiving sensitivity of the FL receiver 21 is reversely set to become worse until a predetermined level as explained later in detail. Namely, the operation instruction signal is outputted to the variable resistor 27 so as to raise the resistance value.

In a step 63, it is determined whether the number of IDs received by the FL receiver 21 is one or not. Namely, it is determined whether the number of IDs included in the signal inputted from the FL receiver 21 to the control ECU 30 is one or not.

When it is determined that the number of IDs inputted from the FL receiver 21 is not one, the process goes back to the step 62 and the signal receiving sensitivity of the FL receiver 21 is again set to become further worse. Thus, the signal receiving sensitivity of the FL receiver 21 is set to become worse until the number of IDS received by the FL receiver 21 becomes one. When it is determined that the number of IDS received by the FL receiver 21 is one, the process goes to a step 64.

As above, the step 63 is repeatedly performed after the signal receiving sensitivity of the FL receiver 21 is set to become worse in the step 62, and after the predetermined time corresponding to about ten times of the transmitting interval for the transmitters 11 to 14 has passed. The step 63 can be repeated during the above predetermined time.

If the step 63 were performed within a short time period after the signal receiving sensitivity of the FL receiver 21 is set to become worse, the control ECU 30 might erroneously determine that the ID inputted to the control ECU 30 is the ID transmitted from the FL transmitter 11. Namely, if the FL receiver 21 receives only one radio wave from the other transmitters 12 to 14 except for the FL transmitter 11 and the number of IDs inputted to the control ECU 30 is one even when no radio wave is transmitted from the FL transmitter 11 after the step 62 is executed, the control ECU 30 might erroneously recognize that this ID is the ID transmitted from the FL transmitter 11.

Therefore, the time interval between the steps 62 and 63 is set to be such a time longer than the transmitting interval of each of the transmitters 11 to 14, so that such erroneous recognition can be prevented and the correct transmitters can be reliably determined.

The time interval between the steps 62 and 63 is not limited to such a time corresponding to the ten times of the transmitting interval of the FL transmitter 11, but can be also set to another time interval, if the other time interval is made to such a time interval during which the radio wave from the FL transmitter 11 can be always received by the FL receiver 21. This time interval is preferably set to the time interval, which is sufficient for the FL receiver 21 to receive the radio waves transmitted from all the transmitters 11 to 14 and to input the four IDs to the control ECU 30, in the case that the signal receiving level of the radio wave in the FL receiver 21 is high enough to sense the radio waves from all of the transmitters 11 to 14.

As described above, it is determined at the step 64 that the information included in the radio wave received by the FL receiver 21 is transmitted from the FL transmitter 11, when the number of IDs inputted from the FL receiver 21 to the control ECU 30 becomes one.

Then, an instruction signal is outputted to the meter 40 so as to display the measuring result transmitted together with the ID in the meter 40 in accordance with necessity, as in a similar manner to the well-known tire monitoring apparatus. For example, the measuring result and a reference value are compared with each other, and in the case that the air pressure is lower than the reference value, a warning lamp within the meter 40 is lighted and the air pressure is digitally displayed with a number within the meter 40.

A function for determining the signal from the transmitter by the control ECU 30 is further explained. As explained with reference to FIG. 3, the distances 51 to 54 between the FL receiver 21 and the respective transmitters 11 to 14, become larger in the order of the distances 51, 52, 53 and 54.

The radio wave has characteristics, according to which the radio wave will be attenuated in proportion to the distance. Therefore, as the propagating distances of the radio wave between the receivers 21 to 24 and the transmitters 11 to 14 are increased, a spatial loss of the radio wave is increased. Namely, as the distances between the receivers 21 to 24 and the transmitters 11 to 14 are increased, the signal receiving level of the radio wave in each of the receivers 21 to 24 is reduced.

Accordingly, the signal receiving level of the radio wave received by the FL receiver 21 is largest in the radio wave transmitted from the FL transmitter 11 nearest to the FL receiver 21, and is reduced in the order of the radio waves transmitted from the FR transmitter 12, the RL transmitter 13 and the RR transmitter 14. For example, the signal receiving levels of the radio waves transmitted from the respective transmitters 11 to 14 in the FL receiver 21 are 60 dB, 40 dB, 30 dB and 20 dB in the order of the transmitters 11, 12, 13 and 14, as shown in FIG. 6.

FIG. 6 shows one example of the signal receiving levels (60 dB to 20 dB) of the FL receiver 21 from the respective transmitters, the signal receiving sensitivity (50 dB) of the FL receiver 21, and the accepted (or not accepted) radio waves from the respective transmitters (◯ is accepted, X is not accepted).

Here, the signal receiving level of the radio wave means electric field intensity, electric current intensity, etc. of the radio wave when the receiving antenna 25 receives the radio wave. In other words, the level of the radio wave means the level of a signal outputted from the receiving antenna 25 in accordance with the electric field intensity, etc. of this radio wave when the receiving antenna 25 receives the radio wave. Here, dB is used as a unit of the signal receiving level, but a voltage (V) may be also used.

The signal receiving sensitivity of the receiver means the electric field intensity, etc. of the radio wave, at which the receiver detects or senses, for the first time, the signal from the transmitters. Namely, the signal receiving sensitivity means the signal receiving level of the radio wave required to convert the signal outputted from the receiving antenna 25 from an analog signal to a digital signal by the AD converter 26 and to output the signal after the conversion from the AD converter 26 to the control ECU 30.

"Making worse the signal receiving sensitivity of the receiver" means that the electric field intensity, etc. to be sensed or detected is made higher. Further, "making the signal receiving sensitivity of the receiver to a preferable state" means that the electric field intensity, etc. to be sensed or detected is made lower.

When the signal receiving sensitivity of the FL receiver 21 is set at a magnitude of 50 dB, as shown in FIG. 6, only the radio wave transmitted from the FL transmitter 11 having a signal receiving level greater than 50 dB is converted in the AD converter 26. On the other hand, non of the radio waves transmitted from the other transmitters 12 to 14 having signal receiving levels smaller than 50 dB is converted in the AD converter 26. Namely, the information for the IDs from the other transmitters 12 to 14 are not sensed or detected by the FL receiver 21.

Therefore, in this embodiment, at the initial stage of the automatic recognition processing from the start to the step 61, the signal receiving sensitivity of the FL receiver 21 is set to the preferable state, e.g., 10 dB, so as to sense the radio waves from all the transmitters 11 to 14. Then, in the step 62, the signal receiving sensitivity of the FL receiver 21 is set to become worse until 50 dB, so as to sense only the radio wave from the FL transmitter 11 by the FL receiver 21.

As shown in FIG. 7, when the signal receiving sensitivity of the FL receiver 21 is set to 10 dB, the receiver 21 can sense the radio waves from all of the transmitters 11 to 14. Namely, the FL receiver 21 receives the IDs transmitted from all the transmitters 11 to 14, and the control ECU 30 determines that the number of IDs received by the FL receiver 21 is four, at the step 61.

When the process goes to the step 62, the signal receiving sensitivity of the FL receiver 21 is made worse by the control ECU 30, e.g. to 25 dB. Then, the radio wave from the RR transmitter 14 is no longer sensed, but the radio waves from the FL, FR and RL transmitters 11, 12 and 13, which have the signal receiving level higher than 25 dB, can be still sensed. Thus, the control ECU 30 recognizes the three IDs of the FL, FR and RL transmitters 11, 12 and 13.

The signal receiving sensitivity of the FL receiver 21 is repeatedly made worse by the control ECU 30 to 50 dB, at which the FL receiver 21 senses only the radio wave from the FL transmitter 11. As a result, the control ECU 30 determines that the number of IDs received by the FL receiver 21 is one, at the step 63, and that the signal inputted from the FL receiver 21 is transmitted from the FL transmitter 11.

As above, the signal receiving sensitivity of the FL receiver 21 is step wise changed from a lower to a higher value. This is because the signal receiving levels of the radio waves transmitted from the respective transmitters 11 to 14 in the FL receiver 21 are not always constant but are varied depending on directivity of each antenna arranged in the respective transmitters and the receivers. Accordingly, in the case that the signal receiving sensitivity of the FL receiver 21 is fixed to 50 dB, none of the radio waves can be sensed by the FL receiver 21 when the signal receiving level of the radio wave from the FL transmitter 11 is occasionally smaller than 50 dB.

As explained above, the control ECU 30 recognizes the FL transmitter 11, and the other transmitters 12, 13 and 14 in the same manner.

As a result, according to the above embodiment, even when the positions of the respective transmitters 11 to 14 and the wheels are changed, the positions of the respective transmitters 11 to 14 and the wheels can be automatically recognized by the control ECU 30 without manually rewriting the IDs of the respective transmitters 11 to 14 in the control ECU 30.

Furthermore, in the above embodiment, each of the receivers 21 to 24 is directly connected to the control ECU 30 by the respective signal lines, so that the signal receiving sensitivities of the respective receivers 21 to 24 can be independently adjusted. Accordingly, the respective transmitters 11 to 14 can be surely recognized by the control ECU 30. Namely, the recognition process of the transmitters can be independently, individually and simultaneously performed for the respective receivers 21 to 24.

As a result, according to the above embodiment, time required to recognize all the transmitters 11 to 14 can be shortened in comparison with a tire monitoring apparatus for performing the recognition processing of all the transmitters 11 to 14 one by one. Further, in this embodiment, no coupling means is required, which has been necessary in the prior art apparatus. Thus, in accordance with this embodiment, the structure of the tire monitoring apparatus can be simplified in comparison with such the prior art apparatus.

In the above embodiment, the control ECU 30 determines whether or not the FL receiver 21 receives the signal including the IDs of all the registered transmitters 11 to 14 in the step 61. And after it is determined that this signal is received, the process goes to the step 62.

This is done for the purpose of confirming that the FL receiver 21 receives the radio waves transmitted from all the transmitters 11 to 14 of its own vehicle. And thereby, the control ECU 30 is prevented from processing the steps 62 to 64, in the case that the FL receiver 21 does not receive the radio wave transmitted from the FL transmitter 11. As a result, an erroneous recognition, which could be caused by such a process in which the process would go on even in the case that the receiver would not receive the radio wave from the corresponding transmitter, is prevented.

Second Embodiment

In the first embodiment, the resistance value of the variable resistor 27 is raised and the signal receiving sensitivity of the FL receiver 21 is made worse, as an example, at the step 62. However, the signal receiving sensitivity of the FL receiver 21 can be also set to be improved by lowering the resistance value of the variable resistor 27.

In this second embodiment, the signal receiving sensitivity of the FL receiver 21 is reversely set to a bad state at the initial stage of the automatic recognition contrary to the first embodiment. For example, the signal receiving sensitivity of the FL receiver 21 is set to 70 dB. In this case, as can be seen from FIG. 6, since the signal receiving levels of all the transmitters 11 to 14 are smaller than 70 dB, none of IDs transmitted from any of the transmitters 11 to 14 is received. Then, the signal receiving sensitivity of the FL receiver 21 is improved. For example, the signal receiving sensitivity of the FL receiver 21 is set to 50 dB. In this case, only the ID transmitted from the FL transmitter 11 is received by the FL receiver 21. Thus, the FL transmitter 11 can be also recognized by the control ECU 30.

Other Embodiments

In the above embodiments, it is determined by the control ECU 30 whether the number of IDs received by the FL receiver 21 is four or not, for the purpose of reliably recognizing the FL transmitter 11 in the step 61. However, the number of IDs is not limited to four, but can be also set to another plural number such as two and three. Furthermore, the ID number can be also set to be more than four, for such a vehicle having tires greater than four tires in a truck, etc.

Even in the above case, the control ECU 30 can also automatically recognize the FL transmitter 11. This is because, if the FL receiver 21 receives plural IDs, the ID of the FL transmitter 11 nearest to the corresponding FL receiver 21 is basically included within those IDs.

Furthermore, even when the number of IDs received by the FL receiver 21 is one in the step 61, the process can be forwardly moved on to the step 64. In this case, the recognition processing of the transmitter in the control ECU 30 becomes a starting state, and the interval until the execution of the step 61 is set to a transmitting time of the radio waves from all the transmitters 11 to 14. Thus, if the number of IDs received by the FL receiver 21 is one, the control ECU 30 can specify the FL transmitter 11.

In this case, however, the received ID can be such ID transmitted from the other transmitters 12 to 14 different from the FL transmitter 11. Therefore, in the step 61, the control ECU 30 preferably determines whether the number of IDs received by the FL receiver 21 is plural or not.

Furthermore, in the above embodiments, the steps 61 to 64 are always performed. The process of the steps 61 to 64 is referred to as "the automatic recognition mode".

As an alternative mode is a generally known mode "a general recognition mode", in which the ID is collated with the ID registered in advance for recognizing the respective transmitters.

In the modified embodiment of the present invention, the above automatic recognition mode and the general recognition mode can be combined. Namely, in such embodiment, the above two recognition modes are performed alternately. In this case, it is stored in a memory, which ID is the ID of the transmitter arranged in which wheel in the automatic recognizing mode.

Thus, the control ECU 30 can also automatically recognize the respective transmitters 11 to 14, even after rotation of the tire. Furthermore, the time taken from the transmission of the measuring result from each of the transmitters 11 to 14 to the display of this measuring result in the meter 40 in the normal mode is shorter than that in the automatic recognizing mode. Accordingly, the time taken until the display of the measuring result in the meter 40 can be shortened by mixing the automatic recognizing mode and the normal mode, in comparison with a case in which the automatic recognizing mode is always executed.

Further, in the above embodiments, the control ECU 30 determines whether the ID is received or not. However, it is also possible to determine whether a signal having the contents of the measuring result is simply received or not instead of the determination as to whether the ID is received or not.

What is claimed is:

1. A tire monitoring apparatus for a vehicle comprising:
    plural transmitting means respectively arranged in plural tires, each having a detecting means for detecting air pressure of the corresponding tire, and transmitting information including a detecting result by a radio wave;
    plural receiving means arranged in the vehicle correspondingly to the respective plural transmitting means and receiving the information transmitted from the respective transmitting means, each of the receiving means having a signal receiving sensitivity changing means for changing signal receiving sensitivities; and
    a control means for receiving the information from the receiving means and performing a control operation so as to display the detecting result included in the information at a display means,
    wherein each of the receiving means is arranged in such a manner that a distance between one receiving means and its corresponding transmitting means is made shorter than the other distances between the one receiving means and the other transmitting means,
    each of the receiving means is connected to the control means, so that each of the receiving means independently transmits the information to the control means when it receives the information contained in the radio wave, and the control means controls the signal receiving sensitivity changing means such that each of the receiving means receives only the information included in the radio wave, which has a largest signal receiving level among the radio waves transmitted from the plural transmitting means.

2. A tire monitoring apparatus according to claim 1, wherein
the control means controls the signal receiving sensitivity changing means to make worse the signal receiving sensitivity, after the information transmitted from more than one transmitting means is received by the receiving means.

3. A tire monitoring apparatus according to claim 1, wherein
the control means controls the signal receiving sensitivity changing means to make worse the signal receiving sensitivity, after the information transmitted from all of the transmitting means is received by each of the receiving means.

4. A tire monitoring apparatus according to claim 2, wherein
an ID for discriminating the respective transmitting means is included in the respective information contained in the radio wave and the respective IDs for the transmitting means are registered in the control means in advance, and
the control means controls the signal receiving sensitivity changing means to make worse the signal receiving sensitivity so that only one ID is inputted from the respective receiving means to the control means, after each of the receiving means has received the plural information of the IDs which are the same to those registered in advance in the control means.

5. A tire monitoring apparatus according to claim 1, wherein
each of the receiving means comprises;
a receiving antenna for receiving the radio wave transmitted from the transmitting means; and
a converter for converting an analog signal outputted from the receiving antenna into a digital signal in accordance with the received radio wave,
wherein the signal receiving sensitivity changing means is a variable resistor connected between the receiving antenna and the converter.

6. A tire monitoring apparatus for a vehicle comprising:
plural transmitting means respectively arranged in plural tires, each having a detecting means for detecting air pressure of the corresponding tire, and transmitting information including a detecting result by a radio wave;
plural receiving means arranged in the vehicle correspondingly to the respective plural transmitting means and receiving the information transmitted from the respective transmitting means, wherein each of the receiving means has a signal receiving sensitivity changing means for changing signal receiving sensitivities, and each of the receiving means is arranged in such a manner that a distance between one receiving means and its corresponding transmitting means is made shorter than the other distances between the one receiving means and the other transmitting means; and
a control means for receiving the information from the receiving means and performing a control operation so as to display the detecting result included in the information at a display means,
wherein a method of monitoring the conditions of the tires comprises the steps of:
transmitting the information received by each of the receiving means to the control means, when each of the receiving means has received the information contained in the radio wave; and
controlling, by the control means, the signal receiving sensitivity changing means such that each of the receiving means receives only the information included in the radio wave, which has a largest signal receiving level among the radio waves transmitted from the plural transmitting means.

7. A method of monitoring the conditions of the tires according to claim 6, wherein
the control means controls the signal receiving sensitivity changing means to make worse the signal receiving sensitivity after the information transmitted from more than one transmitting means is received by each of the receiving means.

8. A method of monitoring the conditions of the tires according to claim 6, wherein
the control means controls the signal receiving sensitivity changing means to make worse the signal receiving sensitivity, after the information transmitted from all of the transmitting means is received by each of the receiving means.

* * * * *